United States Patent [19]
Fixemer

[11] Patent Number: 5,476,147
[45] Date of Patent: Dec. 19, 1995

[54] GUIDANCE SYSTEM FOR AN AGRICULTURAL IMPLEMENT

[76] Inventor: Richard A. Fixemer, R.R. 1, Box 234, Sutton, Nebr. 68979

[21] Appl. No.: 295,247

[22] Filed: Aug. 24, 1994

Related U.S. Application Data

[62] Division of Ser. No. 34,686, Mar. 19, 1993, Pat. No. 5,392,863.

[51] Int. Cl.⁶ .................................................. A01B 69/00
[52] U.S. Cl. ............................................. 172/26; 172/283
[58] Field of Search ................... 172/236, 5, 6, 172/26, 278, 282, 283, 569, 576, 578, 590; 104/244.1; 180/131; 171/47; 56/10.2 F

[56] References Cited

U.S. PATENT DOCUMENTS

| | | | |
|---|---|---|---|
| 759,489 | 5/1904 | Weeks | 172/569 |
| 1,268,085 | 6/1918 | Bimson | 171/47 |
| 1,900,525 | 3/1933 | Silver | 104/244.1 |
| 2,772,617 | 12/1956 | Tangeman | 172/283 |
| 4,228,860 | 10/1980 | Orthman | 172/26 |
| 4,282,934 | 8/1981 | Bezzerides | 172/26 |
| 4,367,621 | 1/1983 | Swetman et al. | 56/10.2 F |
| 4,463,811 | 8/1984 | Winter | 172/26 |
| 4,520,876 | 6/1985 | Peterson et al. | 172/427 |
| 4,616,712 | 10/1986 | Jorgensen | 172/6 |
| 4,640,365 | 2/1987 | Schmidt | 172/26 |
| 4,930,581 | 6/1990 | Fleischer et al. | 172/6 |
| 4,974,683 | 12/1990 | Hanig et al. | 172/156 |
| 5,031,704 | 7/1991 | Fleischer et al. | 172/6 |

OTHER PUBLICATIONS

"Buffalo Hip Huggers", Brochure.
"Buffalo Scout", Brochure.
"The Guide Sideshifter Quick Hitch", Brochure, Lincoln Creek Mfg.
"The Guide Quick Hitch", Brochure, Lincoln Creek Mfg. Co., Inc.
"Orthman MP III Tracker Automatic Guidance System", Brochure, Identified by BAC 9093/8/89, Orthman Mfg, Inc.
"Orthman Computerized Quick Hitch CQH Swinger", Brochure, Identified by BAC 11174/6/91, Orthman Mfg., Inc.
"Orthman Computerized Steering Control CSC Tractor Guidance," Brochure, Identified as BAC 11172/6/91, Orthman Mfg., Inc.
"Ridge Till Farmers Tell How: Raised Beds Lower Costs," article in Apr. 1989 issue of *Soybean Digest*.
"Acura Trak Guidance Control, The Pioneer in Quick Hitch Row Crop Guidance," Brochure, SUNCO.

*Primary Examiner*—Terry Lee Melius
*Assistant Examiner*—Spencer Warnick
*Attorney, Agent, or Firm*—Zarley, McKee, Thomte Voorhees & Sease; Dennis L. Thomte

[57] ABSTRACT

A guidance system for an implement drawn by a tractor with the implement being interconnected to the tractor by a guidance hitch which moves the implement laterally with respect to the tractor to maintain the implement in proper alignment with the rows of the field. An elongated arm is pivotally secured, about a vertical axis, to the implement adjacent one end thereof and extends forwardly therefrom. A pair of gauge wheels are rotatably mounted on the forward end of the arm and are adapted to follow along the opposite sides of a ridge of the row. The pivotal connection between the arm and the tool bar is effected by an angle sensing shaft extending from a guidance sensor. As the implement shifts one way or another with respect to the rows, the relative angular movement between the implement and the arm supporting the gauge wheels changes which causes the angle sensing shaft to be rotated thereby sending a signal to the guidance hitch to actuate the same to move the implement back into proper alignment with the rows. In an embodiment of the invention, the guidance hitch and guidance sensor are not used. The elongated arm supporting the gauge wheels is operatively interconnected to a coulter which is in ground engagement. As the elongated arm supporting the gauge wheels pivots with respect to the implement, as the implement moves out of proper alignment with the rows, the coulter steers the implement back into proper alignment with the rows.

2 Claims, 8 Drawing Sheets

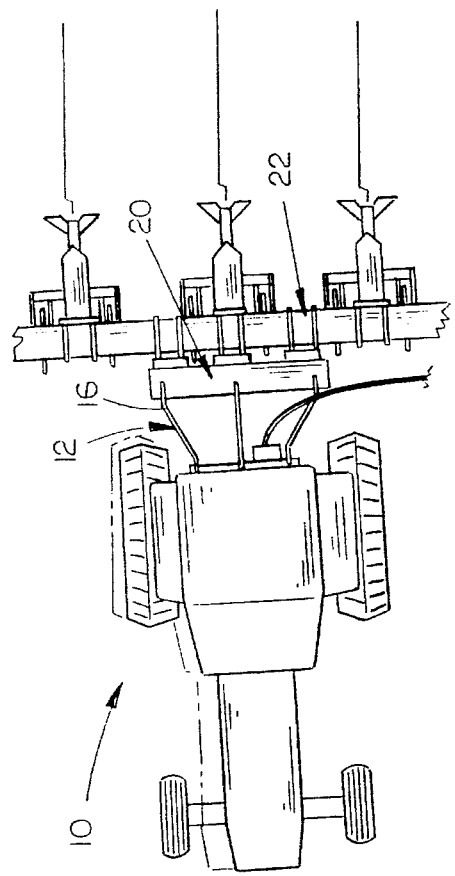
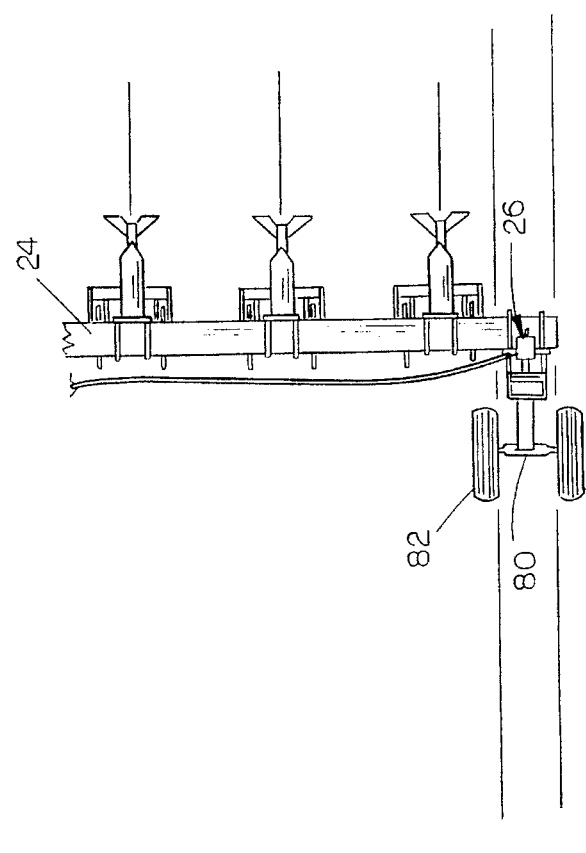
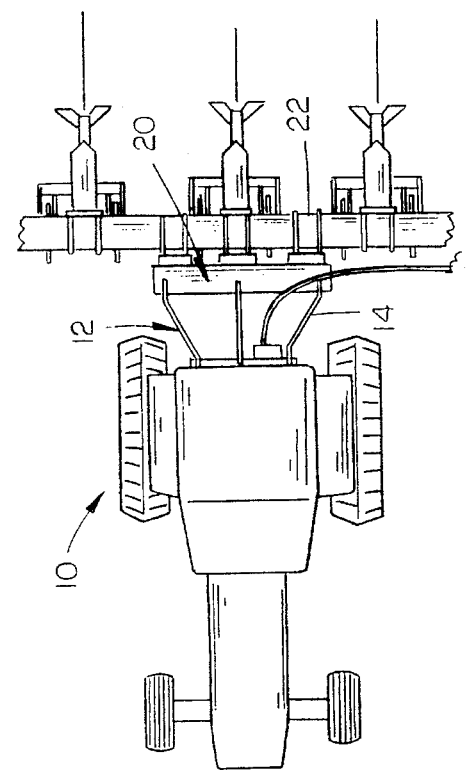
FIG. 2
FIG. 3

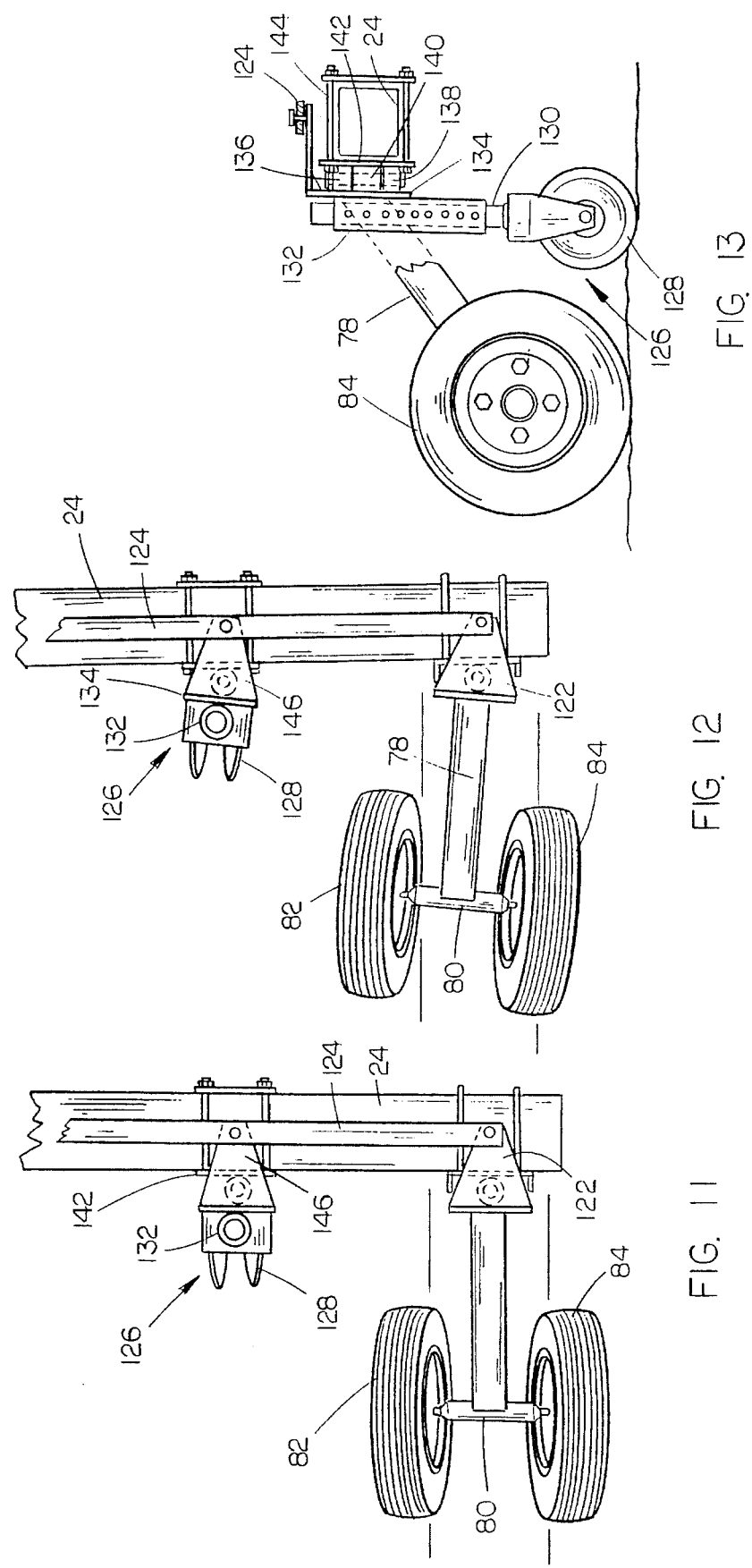

GUIDANCE SYSTEM FOR AN AGRICULTURAL IMPLEMENT

CROSS-REFERENCE TO RELATED APPLICATION

This is a divisional application of application Ser. No. 08/034,686 filed Mar. 19, 1993 now U.S. Pat. No. 5,392,863.

BACKGROUND OF THE INVENTION

1. Field of the Invention

This invention relates to a guidance system for an agricultural implement and more particularly to a means for mounting a guidance system forwardly of the implement adjacent one end thereof.

2. Description of the Prior Art

In many farming operations, agricultural implements such as cultivators, planters, fertilizer spreaders, and sprayers are pulled by tractors and are used in connection with row crops. It is extremely important that the implement be properly positioned with respect to the row so that the implement does not damage the crop. In ridge till operations, it is extremely important that the planter be centered with respect to the ridge so that the seeds are properly positioned in the ridges. It is also important that the fertilizer applicators and sprayers also be properly positioned with respect to the growing crop in the ridge. In cultivating operations, it is very important that the cultivator be properly positioned with respect to the rows to prevent damage to the growing crop.

Many types of guidance devices have been previously provided for use with an agricultural implement so that the implement will be moved laterally with respect to the tractor should the implement be out of alignment with the rows being planted, cultivated, etc. One type of guidance control apparatus is disclosed in U.S. Pat. No. 4,930,581 issued Jun. 5, 1990 to Fleischer et al. In the device of the '581 patent, the position of the implement is sensed by a pair of sensing wands which engage the emerging crops of adjacent rows. Should the implement move laterally with respect to the row for one reason or another, the wand resolver, which is operatively connected to the sensing wands, will generate an electrical signal to actuate a hydraulic circuit so that the hitch connecting the implement and the tractor will pivot about a vertical axis to laterally shift the implement.

A guidance system which is believed to be very similar, if not identical to the device disclosed in U.S. Pat. No. 4,930,581, is manufactured by Fleischer Manufacturing, Inc., Columbus, Nebr., under the trademark BUFFALO SCOUT.

Another type of guidance system is manufactured by Lincoln Creek Manufacturing Co., Inc. of Phillips, Nebr., under the trademark THE GUIDE. It is believed that the guidance system manufactured by Lincoln Creek Manufacturing Co., Inc. laterally shifts the hitch which connects the implement and the tractor when the implement is sensed to be out of alignment with the row.

Yet another type of guidance control is manufactured by Sunco Marketing of North Platte, Nebr., under the trademark ACURA TRAK. Other types of guidance systems are manufactured by Orthman Manufacturing Co., Inc. of Lexington, Nebr. under the trademarks CQH SWINGER and MP III TRACKER.

In the prior art guidance systems described hereinabove, the systems include guide rods, guide weights, sensing wands or the like which are normally located at the center of the implement and are normally positioned behind the draw bar of the implement and dragged through the field. It is believed that the prior art guidance systems suffer from certain disadvantages in that the guide weights, wands, rods, etc. are not able to accurately sense the position of the implement due to the condition of the field which may have clods, rocks, crop residue, etc. in the rows which adversely effects the sensing operation. Further, by positioning the sensing means behind the draw bar, it is believed that the sensing means suffers from a slight delay in sensing the position of the implement since the front portion of the implement will have already passed over that which is being sensed.

BRIEF DESCRIPTION IF THE DRAWINGS

FIG. 2 is a partial top elevational view of the guidance system of this invention;

FIG. 3 is a view similar to FIG. 2 except that it illustrates the implement having been pivoted relative to the guidance sensor;

FIG. 11 is a partial top view illustrating a modification of the invention;

FIG. 12 is a view similar to FIG. 11 except that the tool bar and gauge wheels have pivoted relative to one another; and FIG. 13 is a side view of the invention of FIG. 11.

SUMMARY OF THE INVENTION

Figure 1:
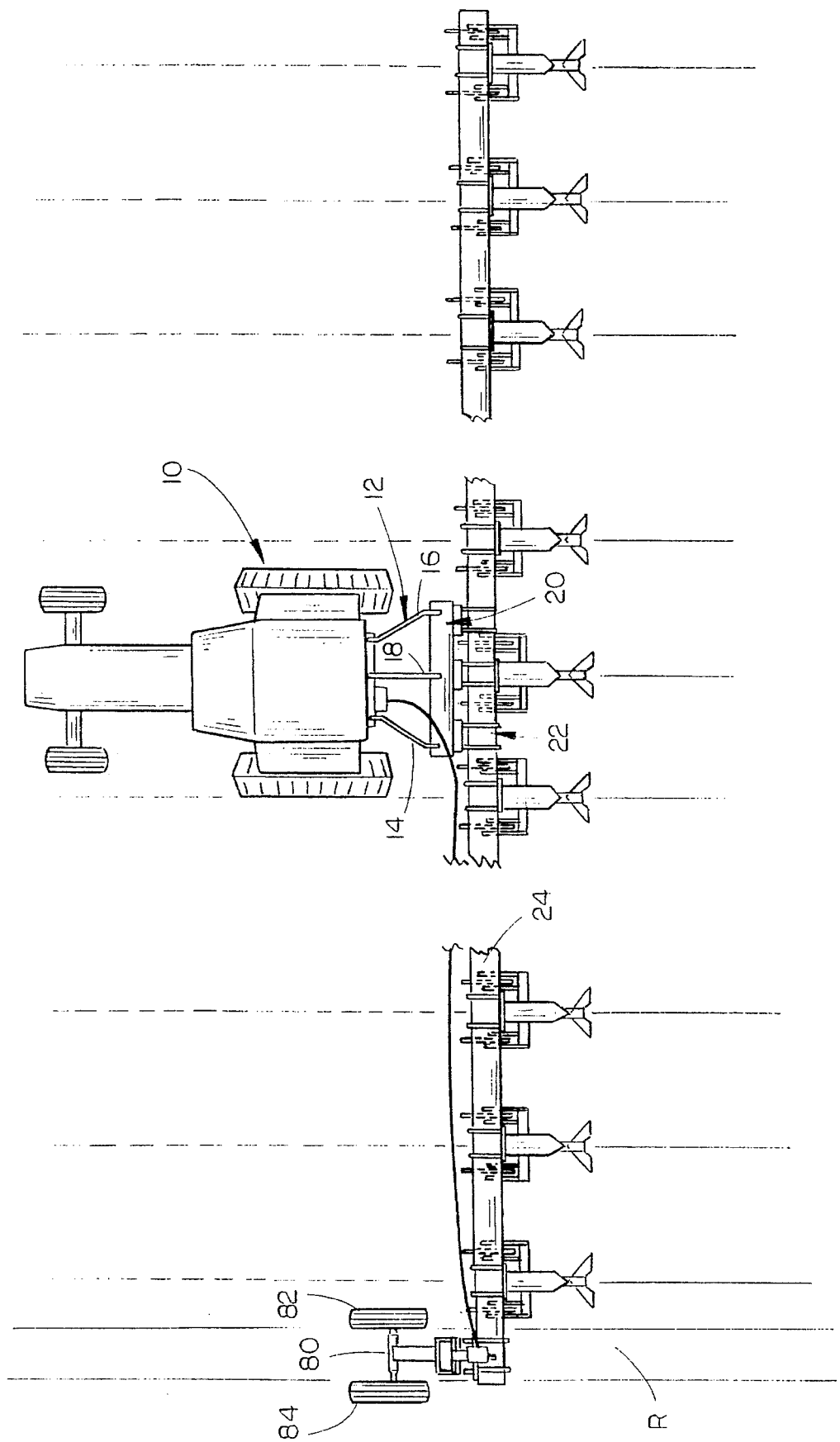
FIG. 1 is a partial top elevational view of the guidance system of this invention.

A guidance system is comprised which is adapted for use with an implement being drawn by a tractor with the implement being connected to the tractor by a guidance hitch of conventional design which is capable of laterally moving the implement, by shifting the same or by pivoting the same, with respect to the tractor, to bring the implement back into proper alignment with the ridges and furrows of the rows. A guidance sensor is secured to the implement at the forward end thereof adjacent one end thereof and includes a vertically disposed angle sensing shaft for sensing the relative pivotal movement between the implement and the guidance sensor. An elongated support is secured to the angle sensing shaft and extends forwardly therefrom. A pair of ground engaging gauge wheels are mounted at the forward end of the elongated support and are normally positioned on opposite sides of a ridge. If the implement should move out of proper alignment with the rows, the implement will pivot slightly with respect to the angle sensing shaft of the guidance sensor. The angle sensing shaft senses the relative pivotal movement between the implement and the elongated support and sends an electrical signal, in conventional fashion, to the guidance hitch so that the hitch may be moved laterally to bring the implement back into proper alignment with respect to the rows. By positioning the guidance sensor near one end of the implement and positioning the same forwardly of the implement, the position of the implement is more precisely sensed without being affected by dirt clods, crop residue, etc.

The modification of the invention is also disclosed wherein the guidance hitch is not employed on the implement. In the modified form of the invention, the elongated arm is pivotally secured, about a vertical axis, to the implement. At least one coulter is operatively secured to the implement in a spaced condition from the elongated support and is normally adapted to follow a furrow in the field. A linkage means interconnects the elongated support and the coulter to cause the coulter to pivot about a vertical axis as the relative pivotal movement is experienced between the implement and the support so that the coulter will steer the implement back into proper alignment with the rows.

It is therefore a principal object of the invention to provide an improved guidance system for an implement.

Yet another object of the invention is to provide a guidance system for an implement wherein the guidance system is secured to the implement at the forward end adjacent one end thereof to precisely sense the relative pivotal movement between the implement and the sensor so that the guidance hitch associated therewith will be activated.

Yet another object of the invention is to provide a guidance system including an angle sensing shaft which pivotally connects a pair of gauge wheels and the tool bar of the implement adjacent one end of the implement.

Still another object of the invention is to provide a guidance system which will function with a variety of different types of conventional guidance hitches.

Still another object of the invention is to provide a guidance system which may be easily mounted on conventional implements such as planters, fertilizer applicators, cultivators, sprayers, etc. without extensive modification of the implement.

Still another object of the invention is to provide a guidance system which steers the implement back into proper alignment with the respective rows should the implement move out of alignment with the rows.

Yet another object of the invention is to provide a guidance system of the type described which is economical of manufacture, durable in use and refined in appearance.

These and other objects of the present invention will be apparent to those skilled in the art.

DESCRIPTION OF THE PREFERRED EMBODIMENT

In the drawings, the numeral 10 refers to a conventional tractor having a conventional 3-point hitch 12 positioned at the rear end thereof. Hitch 12 includes lower links 14 and 16 and upper link 18. The lower links 14 and 16 are normally prevented from lateral movement by conventional sway bars or the like. However, when a guidance hitch is associated therewith, those sway bars are normally removed to enable the hitch 12 to move with respect to the tractor in conventional fashion.

The numeral 20 refers to a conventional prior art guidance hitch or compensation hitch such as described hereinabove. For example, the guidance hitch 20 could be of the type which pivotally moves about a vertical axis to laterally move the implement, through pivotal movement, or could be of the type wherein the guidance hitch 20 is moved horizontally laterally to move or shift the implement back to the proper position.

The hitch 20 may be of the types manufactured by Orthman Manufacturing Co., Inc. of Lexington, Nebr. under the trademarks MP III TRACKER and CQH SWINGER. The guidance hitch 20 could be of the type marketed by Sunco Marketing of North Platte, Nebr. under the trademark ACURA TRAK. Yet another type of hitch 20 that could be used is that manufactured by Lincoln Creek Manufacturing Co., Inc. of Phillips, Nebr., under the trademark THE GUIDE. Regardless of the type of guidance hitch 20 employed, the hitch will include some means for either pivoting the tool bar of the implement with respect to the 3-point hitch of the tractor or will laterally shift the tool bar of the implement to move the implement back into proper alignment with the rows of the field. The preferred embodiment of this invention is to provide an improved position sensing mechanism to actuate the particular hitch with which it is associated.

The numeral 22 refers to a conventional implement which in the drawings is illustrated as comprising a cultivator. However, the implement could be a planter, fertilizer applicator, sprayer, etc. In most cases, the implement 22 will include a horizontally extending tool bar 24. If the implement does not include a tool bar, the guidance sensor of this invention will be directly mounted to the frame of the implement adjacent one end thereof so that it is positioned forwardly thereof.

The numeral 26 refers to a conventional guidance sensor such as marketed by Lincoln Creek Manufacturing Co., Inc. Suitable types of guidance sensors are also described in U.S. Pat. Nos. 4,930,581 and 4,640,365.

Figure 4:
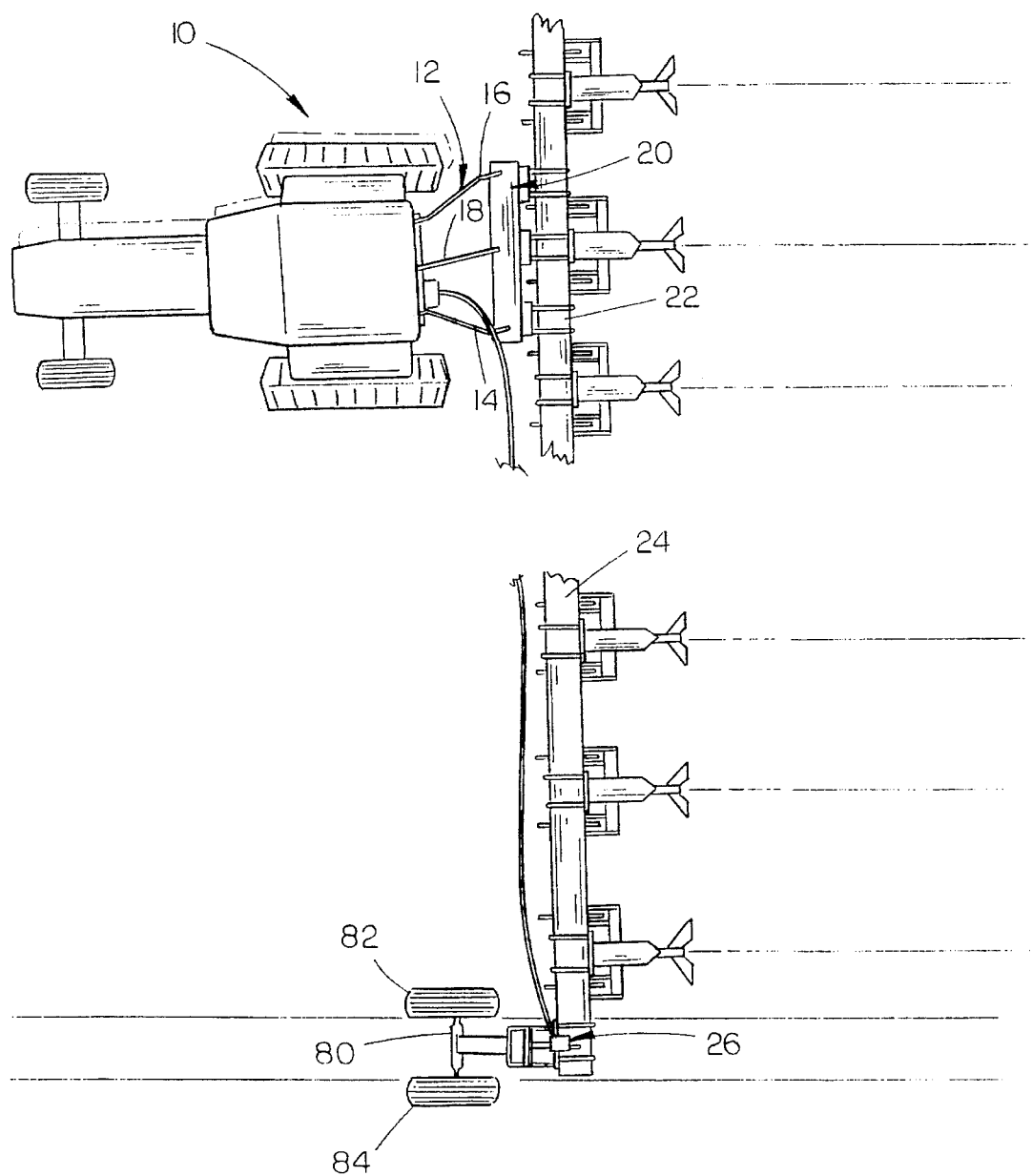
FIG. 4 is a view similar to FIG. 3 except that the guidance sensor has actuated the guidance hitch to shift the implement into proper alignment with the rows.
Figure 5:
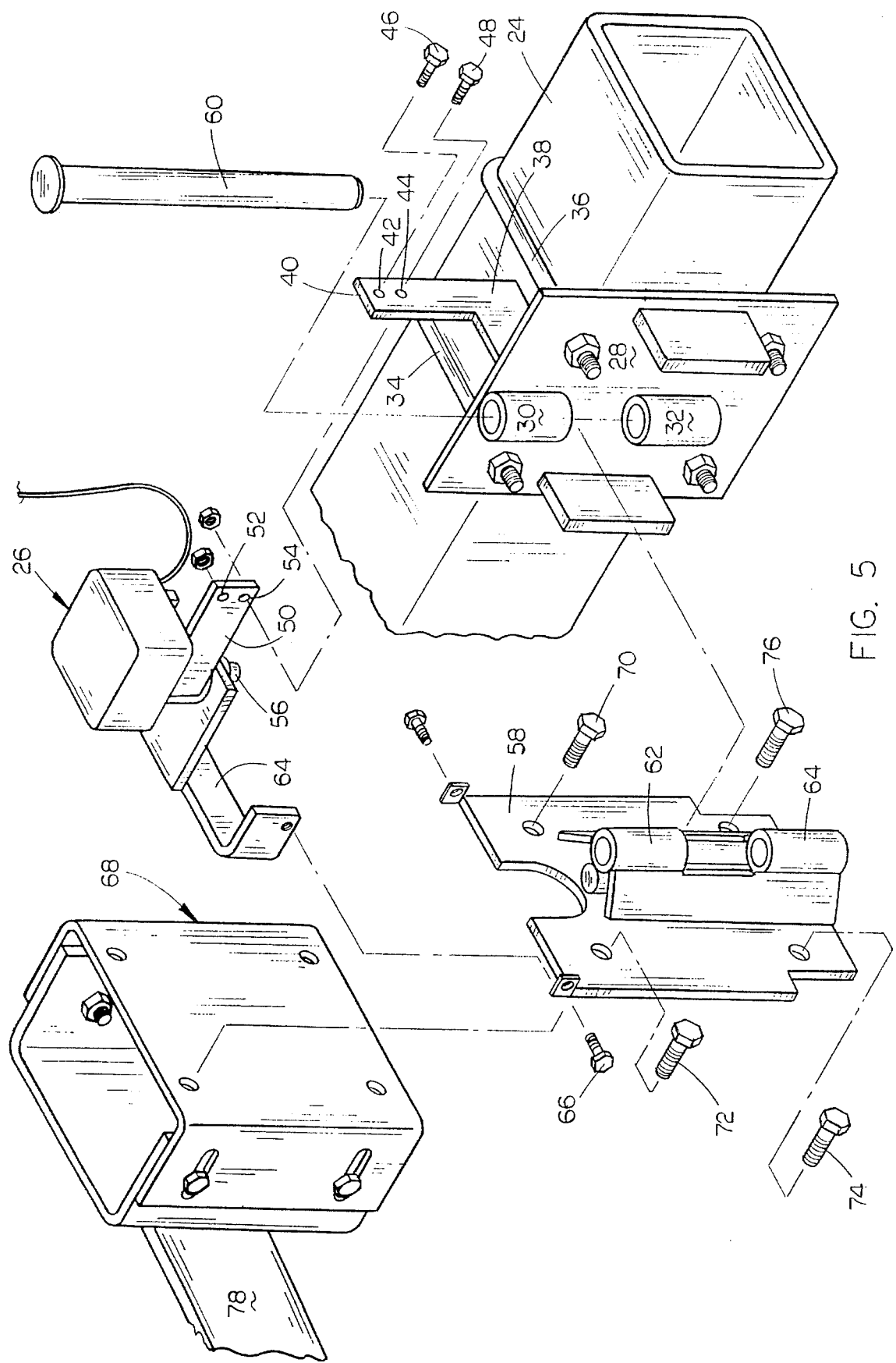
FIG. 5 is an exploded perspective view of the means for mounting the guidance sensor on the tool bar.
Figure 6:
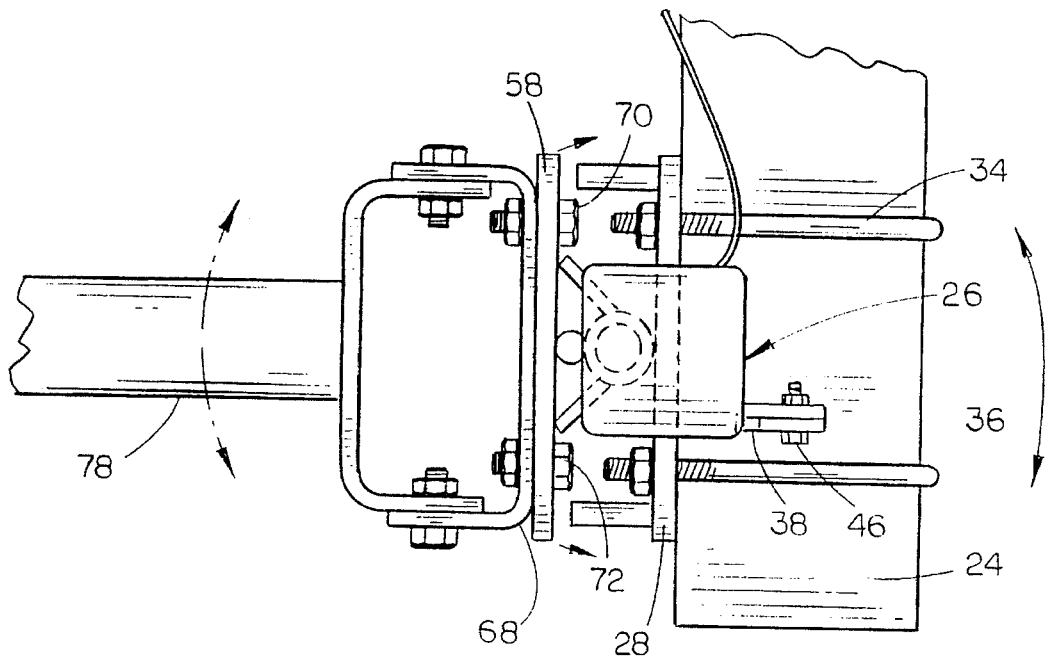
FIG. 6 is a top view of the means for mounting the guidance sensor on the tool bar.
Figure 7:
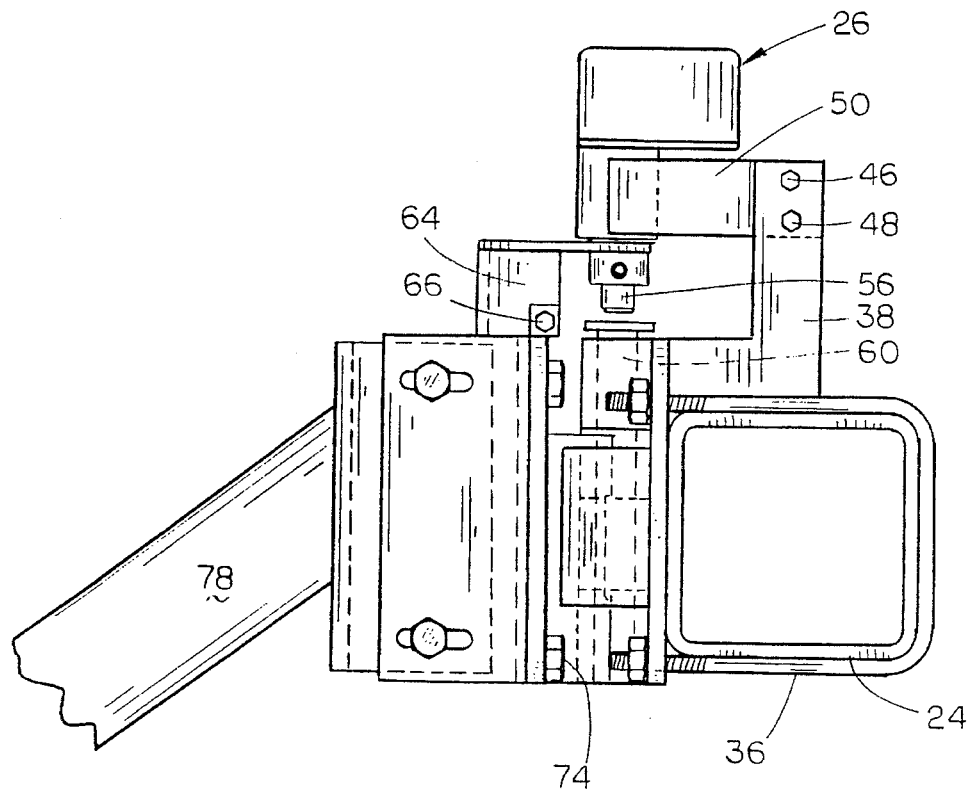
FIG. 7 is a side elevational view of the means for mounting the guidance sensor on the tool bar.

Guidance sensor 26 is mounted on the tool bar 24 as will now be described. Plate 28 is bolted to the forward side of tool bar 24 and includes a pair of spaced apart collars 30 and 32 welded thereto. As seen in FIG. 4, plate 28 is secured to tool bar 24 by U-bolt assemblies 34 and 36. An L-shaped member 38 is welded to the rearward side of plate 28 and has an upper end 40 having a pair of openings 42 and 44 formed therein which are adapted to receive bolts 46 and 48 respectively. Sensor 26 is provided with a horizontally extending bar 50 having a pair of openings 52 and 54 formed therein through which the bolts 46 and 48 extend so that the sensor 26 is mounted on member 38.

Guidance sensor 26 includes a vertically disposed angle sensing shaft 56 which is rotatable in the sensor and which generates an electrical signal, in conventional fashion, when shaft 56 is rotated relative to sensor 26. As stated, sensor 26 is of conventional design and will supply an electrical signal to the guidance hitch 20 when shaft 56 is rotated in either direction with respect to sensor 26. Plate 58 is pivotally secured to plate 28 by means of the pin 60 extending downwardly through the collars 62 and 64 provided on plate 58 and the collars 30 and 32 on the plate 28. Arm 64, which is operatively secured to the shaft 56, is secured to plate 58 by bolt 66. Thus, pivotal movement of plate 58 with respect to plate 28 will cause arm 64 to move which will cause the rotation or pivoting of shaft 56.

Figure 8:
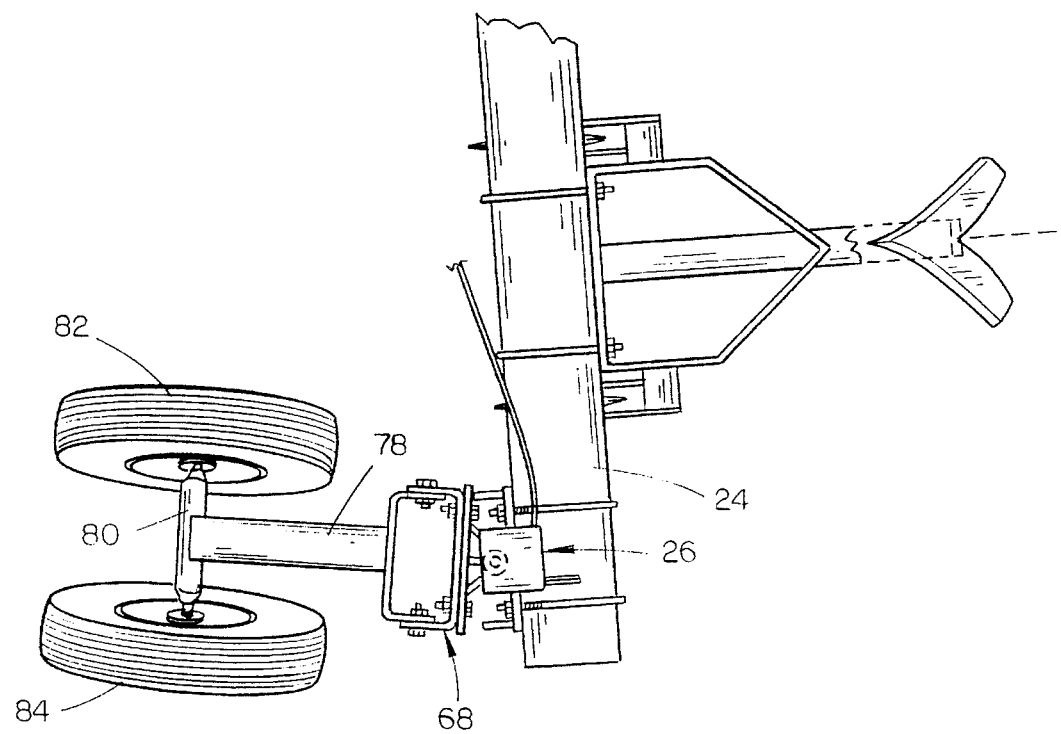
FIG. 8 is a top view illustrating relative pivotal movement between the tool bar and the gauge wheels.
Figure 9:
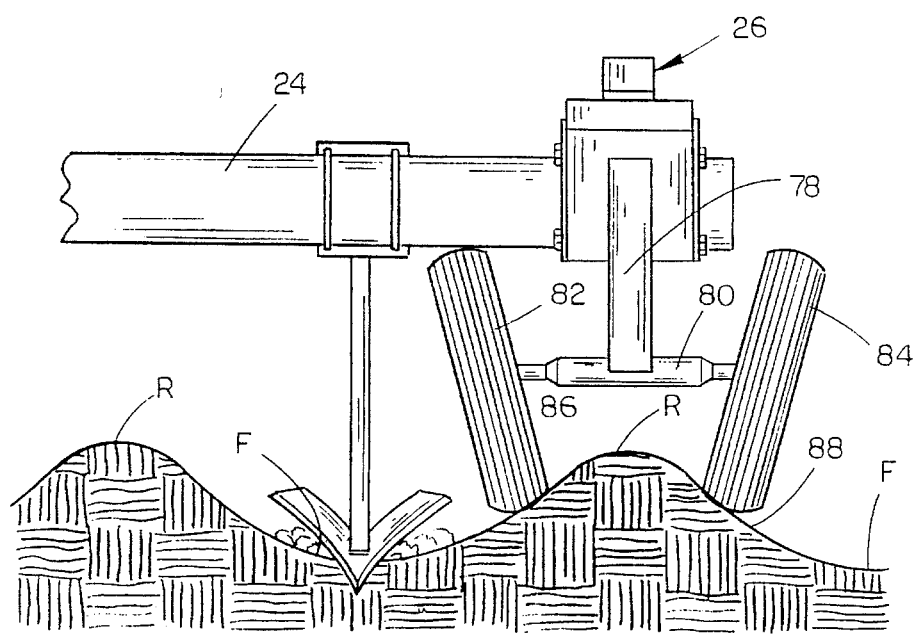
FIG. 9 is a front view illustrating the guide wheels following the ridge in the field.
Figure 10:
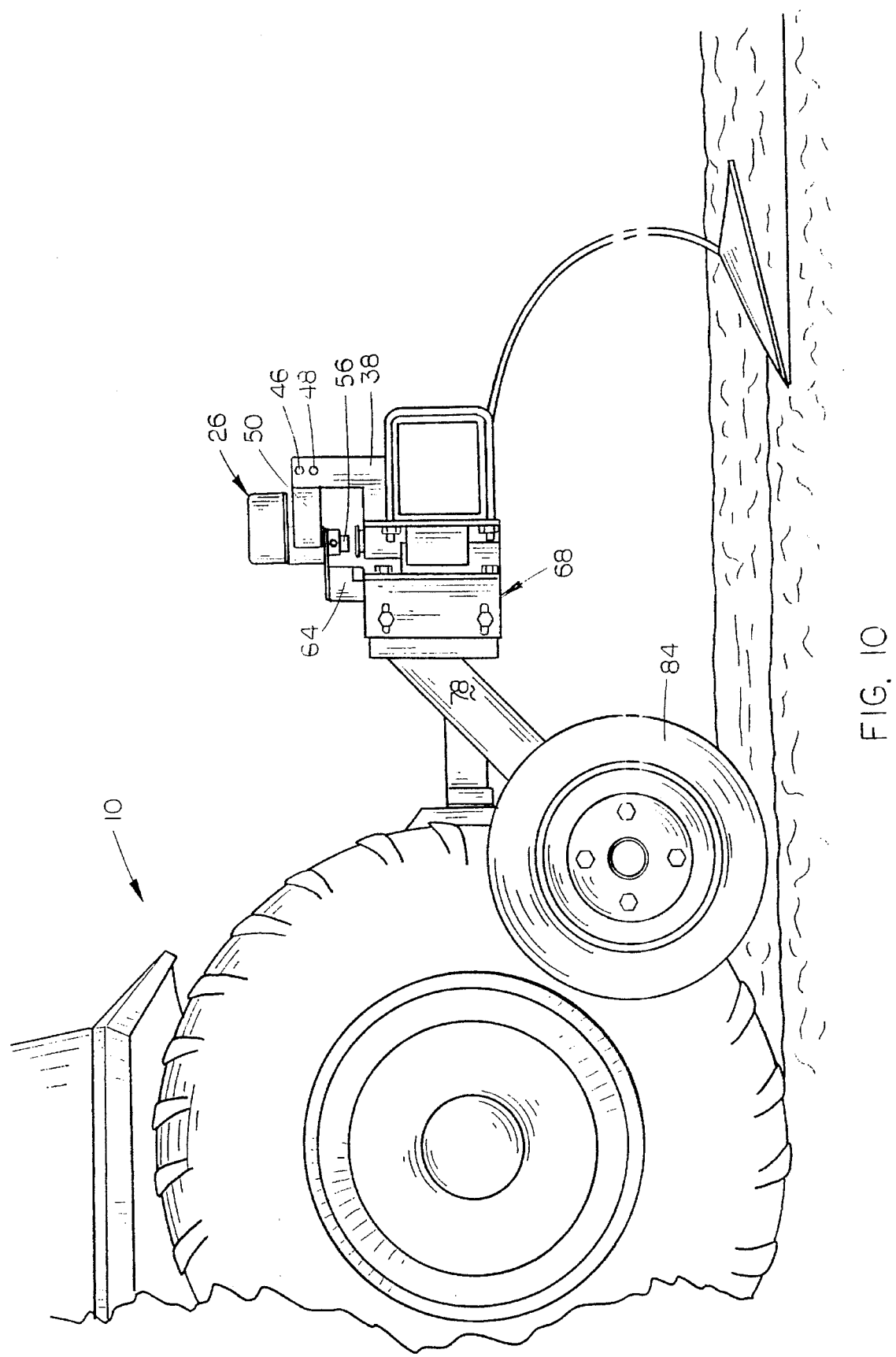
FIG. 10 is a side view of the invention.

Support 68 is secured to plate 58 by means of bolts 70, 72, 74 and 76. An elongated arm 78 is welded to the forward side of support 68 and extends forwardly and downwardly therefrom as best seen in FIG. 9. Axle 80 is secured to the lower forward end of arm 78 and has a pair of gauge wheels 82 and 84 rotatably mounted thereon which are angled with respect to the vertical as illustrated in FIG. 8 and which are adapted to engage the sides 86 and 88 of ridge R. As seen in FIG. 8, furrows F are positioned on opposite sides of the ridge R.

The gauge wheels 82 and 84 not only serve as gauge wheels to limit the depth that the implement will penetrate the ground but also serve as an important part of the guidance systems of this invention. Although a single wheel could be utilized which would follow in one of the furrows F, it is preferred that a pair of the wheels be utilized which follow along opposite sides of the ridge. The wheels 82 and 84 could also be replaced by the conical-shaped wheels manufactured by Fleischer Manufacturing, Inc. of Columbus, Nebr. under the trademark HIP HUGGERS. Further, metal discs could also be used which would follow along the furrows F.

If the implement is properly positioned with respect to the rows of the field as illustrated in FIG. 1 and 8, the guidance hitch 20 is in neutral. In such a condition, angle sensing shaft 56 does not sense any relative pivotal movement between the tool bar 24 and the arm 78. Should the implement begin to move out of alignment with the rows, the tool bar 24 will move laterally with the tractor thereby causing the shaft 56 to be rotated which causes a signal to be sent to the guidance hitch 20 to actuate the same in the proper fashion. When the guidance hitch 20 is supplied with a signal from the sensor 26 that indicates that the implement has moved either one way or another with respect to the row, guidance hitch 20 will either pivot or shift which will cause the 3-point hitch 12 of the tractor to move laterally with respect to the tractor so that the implement will be quickly brought back into proper alignment with the rows.

As stated, FIG. 1 illustrates the implement in proper aligned condition with respect to the rows of the field. At this time, the guidance hitch 20 is in its neutral position. FIG. 2 also illustrates the implement in its proper aligned condition with respect to the rows of the field. Should the tractor move to the left, as viewed from behind the tractor, with respect to the rows, the left end of the tool bar moves to the left with respect to the rows of the field which causes relative angular movement to be created between the tool bar 24 and the arm 78 as sensed by the angle sensing shaft 56. The angle sensing shaft 56 causes an electrical signal to be generated in the guidance sensor 26 with the electrical signal being supplied to the guidance hitch 20 to cause the guidance hitch 20 to shift the tool bar back into proper alignment with respect to the rows. The movement of the tool bar back into the proper alignment is caused by pivoting the tool bar from the position of FIG. 3 to the position of FIG. 4 if the guidance hitch is of the pivotal type. If the guidance hitch is of the longitudinally shifting type, the tool bar would be shifted to the right as viewed from behind the implement to cause the implement to be brought back into the proper alignment with the rows.

It is very important to note that the gauge wheels 82 and 84, or the equivalent thereof, are positioned forwardly of the tool bar 24. By positioning the gauge wheels 82 and 84 forwardly of the tool bar, the misalignment of the implement will be sensed in advance of that which would have been sensed if the sensing device was located rearwardly of the implement. It is also believed that the positioning of the sensing device at one end of the implement also permits a much more precise sensing of misalignment of the implement.

As stated, FIGS. 11 and 12 illustrate a modification of the invention. The embodiment of FIGS. 11 and 12 is used to steer the implement back into proper position, when misalignment is sensed, without the need of a guidance sensor 26 or guidance hitch 20.

In FIG. 11, the support 78, having the gauge wheels 82 and 84 mounted thereon, extends forwardly from a vertically disposed pivot pin 120 which is operatively rotatably mounted on the forward end of the tool bar 24. Link 122 is operatively secured to the upper end of the pivot pin 120 by welding or the like and extends rearwardly therefrom. One end of link 24 is pivotally connected to the rearward end of link 22 and extends therefrom along the length of the tool bar 24 as illustrated in the drawing.

The numeral 126 refers to a coulter assembly which is mounted on the tool bar 24 in a spaced condition to the arm 78 as illustrated in FIGS. 11 and 12. Coulter assembly 26 includes a coulter 128 which is in ground engagement and which is adapted to follow along the furrow of a row. Shaft 130 extends upwardly from coulter 128 and has its upper end vertically adjustably received in sleeve 132. Sleeve 132 is welded to the rearward surface of a plate 134 having a pair of collars 136 and 138 secured thereto by welding or the like and which are positioned forwardly thereof. Collars 136 and 138 are vertically spaced apart and are adapted to have collar 140 positioned therebetween. Collar 140 is welded to plate 142 which is secured to tool bar 24 by the bolt assembly referred to generally by the reference numeral 144.

Link 146 is operatively secured to the upper end of the plate 134 and is adapted to cause coulter 128 to be angled with respect to the tool bar 24 if the link 146 is pivotally moved. As seen in FIG. 12, the rearward end of link 146 is pivotally connected to the link 124. Preferably, a coulter assembly 126 would be also provided on the tool bar 24 adjacent the other end thereof. If the tool bar 24 is of the non-folding type, linkage 124 may be used to interconnect the two coulter assemblies. If the tool bar 24 is of the folding type, some other type of connection will be required such as electrical, hydraulic, etc.

FIG. 11 illustrates the tool bar 24 and the gauge wheels 82 and 84 in their proper aligned condition with the furrows of the rows. If the tool bar 24 should be shifted to the left as viewed from behind the tractor, relative angular movement is created between the arm 78 and the tool bar 74. As arm 78 pivotally moves with respect to tool bar 24, coulter 128 is also pivoted in the same angular direction. The engagement of the coulter 128 with the furrow, when having been angled, tends to steer the implement back into proper alignment with the rows. As the implement is steered back into proper alignment with the rows, the arm 78 moves back to its proper position which causes the coulter 128 to be also pivotally moved.

Thus it can be seen that a novel steering system has been provided for an implement wherein the position of the tool bar with respect to the rows is sensed by a pair of gauge wheels positioned forwardly of the tool bar with those gauge wheels being operatively connected to a steering coulter so that the implement is steered back into proper alignment with the rows. If the implement is moved to the right by the tractor, the coulter 128 will similarly tend to steer the implement back into proper position. In summary, if the implement moves left, the coulter 128 steers the implement to the right. Conversely, if the implement moves to the right, the coulter 128 steers the implement to the left.

Thus it can be seen that the invention accomplishes at least all of its stated objectives.

I claim:

1. A guidance system for an implement drawn by a tractor with the implement being interconnected to the tractor by a hitch means, the implement including a tool bar having a rearward side, a forward side, and opposite ends, comprising:

an elongated first support having rearward and forward ends;

said first support being pivotally secured, about a vertical axis, to said tool bar inwardly of one end thereof and extending forwardly therefrom;

a ground engaging means rotatably mounted to said first support at the forward end thereof for following a row;

at least one second support pivotally secured to said tool bar about a vertical axis, said second support vertical axis being in the same vertical plane and in a horizontally spaced relationship with respect to said first support vertical axis;

a ground engaging coulter pivotally secured, about a vertical axis, to said second support for engagement with a furrow between adjacent rows;

a mechanical linkage means interconnecting said first support and said coulter for pivoting said coulter, about its said vertical axis, with respect to said implement, corresponding to the angle between the longitudinal axis of said first elongated support and said tool bar, whereby said coulter aids in steering the implement into proper position with respect to the rows when said implement has moved out of alignment with the rows as sensed by the relative pivotal movement between said first support and said implement.

2. The guidance system of claim 1 wherein said ground engaging means on said first support comprises a pair of spaced apart wheels adapted to be positioned on opposite sides of a ridge of a row.

* * * * *